United States Patent
Shanti et al.

(10) Patent No.: US 11,286,571 B2
(45) Date of Patent: Mar. 29, 2022

(54) MITIGATING INTERNAL CORROSION OF CRUDE OIL TRANSPORTATION PIPELINE

(71) Applicant: Indian Oil Corporation Limited, Mumbai (IN)

(72) Inventors: Prakash Shanti, Faridabad (IN); Tanmay Mandal, Faridabad (IN); Ajay Kumar Arora, Faridabad (IN); Vivekanand Kagdiyal, Faridabad (IN); Suresh Kumar Puri, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 102 days.

(21) Appl. No.: 16/801,712

(22) Filed: Feb. 26, 2020

(65) Prior Publication Data
US 2020/0370185 A1 Nov. 26, 2020

(30) Foreign Application Priority Data
May 21, 2019 (IN) .............................. 201921020155

(51) Int. Cl.
*C23F 11/12* (2006.01)
*C23F 11/14* (2006.01)
*C23F 11/10* (2006.01)
*C09K 8/54* (2006.01)

(52) U.S. Cl.
CPC .............. *C23F 11/126* (2013.01); *C09K 8/54* (2013.01); *C23F 11/10* (2013.01); *C23F 11/124* (2013.01); *C23F 11/128* (2013.01); *C23F 11/14* (2013.01); *C23F 11/141* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 2,466,517 A | 4/1949 | Blair, Jr. | |
| 2,640,029 A | 5/1953 | Blair, Jr. | |
| 2,718,503 A * | 9/1955 | Rocchini | C10L 1/224 508/514 |
| 2,782,164 A * | 2/1957 | Fischer | C23F 11/10 507/244 |
| 3,623,979 A | 11/1971 | Maddox, Jr. | |
| 4,028,117 A * | 6/1977 | Moat | F16L 58/00 106/14.27 |
| 6,866,797 B1 | 3/2005 | Martin et al. | |
| 2013/0227878 A1* | 9/2013 | Wolf | C10L 1/2225 44/404 |
| 2017/0247798 A1* | 8/2017 | Moloney | C23F 11/04 |
| 2019/0031944 A1 | 1/2019 | Mandal et al. | |

FOREIGN PATENT DOCUMENTS

IN 201721026725 A 2/2019

OTHER PUBLICATIONS

Russian Office Action, dated Jun. 23, 2020, from Russia Application No. 2020110152 filed Mar. 11, 2020.
Extended European Search Report, dated Sep. 8, 2020, from European Application No. 20159449.6 filed Feb. 26, 2020.
Lubi, Mary C. et al., "Cashew Nut Shell Liquid (CNSL)—a versatile monomer for polymer synthesis", Designed Monomers and Polymers, Apr. 2, 2012, vol. 3, No. 2, pp. 123-153.

* cited by examiner

*Primary Examiner* — Katie L. Hammer
(74) *Attorney, Agent, or Firm* — Workman Nydegger

(57) ABSTRACT

The present invention relates to development of high performing oil soluble and water dispersible corrosion inhibitor composition for mitigating internal corrosion of crude oil pipelines during storage and transportation of crude oils. The developed composition consists of acid-amine complex as corrosion inhibiting agent, mixture of organic acids as dispersing agent and ester derivative of alkylated phenol for better film formation. The present invention further relates to a process of preparation of the oil soluble and water dispersible corrosion inhibitor composition and subsequently a process for protecting the corrosion of internal metal surface of crude oil transportation pipelines using the corrosion inhibitor composition.

14 Claims, No Drawings

MITIGATING INTERNAL CORROSION OF CRUDE OIL TRANSPORTATION PIPELINE

FIELD OF THE INVENTION

The present invention relates to development of high performing oil soluble water dispersible corrosion inhibitor composition for mitigating internal corrosion of pipelines during crude oil transportation. Further, the present invention relates to a process for the preparation of the oil soluble water dispersible corrosion inhibitor composition.

BACKGROUND OF THE INVENTION

Internal corrosion is one of the major challenges to crude oil transportation. Internal corrosion is a perennial and costly problem of pipelines due to presence of moisture. Corrosion inhibition during transportation of petroleum products therefore, becomes an integral part of pipeline operation. Water is usually present in crude oils, and its complete removal is difficult. The corrosion generally takes place in those locations where water drops out of crude oil and comes in contact with the metal surface of the pipelines. Water acts as an electrolyte and causes corrosion. It also tends to hydrolyze other materials, particularly chlorides, and thus forms an acidic environment. It has also been observed that the leakage of oil and included salt water in some areas becomes a public hazard.

Now-a-days maintenance of pipelines in petroleum and crude oil industry is becoming very expensive because of corrosion which damages the steel pipelines. To avoid such expenses it becomes a common practice to apply anti corrosive substance for the transportation of crude and/or refined petroleum liquid by pipelines. Several products are reported in the literature as corrosion inhibitor. These corrosion inhibitors are based on amide, imidazolines or its oligomers, pyridinium salt, tetrahydropyrimidine, quaternary ammonium compounds. Most of those processes either end up with a complex mixture of molecules or involve multi step reaction for the production.

U.S. Pat. No. 2,640,029 describes a tetrahydropyrimidine based corrosion inhibitor composition for preventing corrosion of metals particularly iron, steel and ferrous alloys. This composition appear to possess properties which impart to metals resistance to attack by a variety of corrosive agents such as brines, weak, inorganic acids, organic acids, $CO_2$, $H_2S$, $O_2$ etc.

U.S. Pat. No. 2,466,517 describes a corrosion inhibitor composition for preventing corrosion of metals and particularly iron, steel, and ferrous alloys. The corrosion inhibitor is utilized in the prevention of corrosion of pipe or equipment which is in contact with a corrosive oil-containing medium, for example, in oil wells producing corrosive oil or oil-brine mixtures, in refineries. The corrosion inhibitor is based on cyclic amidines, and in particular are substituted imidazolines, in which the imidazoline molecule contains at least one aliphatic, or cycloaliphatic hydrocarbon group containing from 8 to 32 carbon atoms.

CN101280222B discloses water soluble corrosion inhibitor for application in refinery processing unit. Corrosion inhibitor is composed of 20-70 wt % of imidazolines derivatives, 1-10 wt % of pyridine derivatives, 1-20 wt % of corrosion inhibition auxiliary agent and 10-50 wt % of solvent.

U.S. Pat. No. 6,866,797B1 discloses quaternary ammonium based compounds which are found to be effective as corrosion inhibitors. These quaternary ammonium compounds may be used alone or in combination with additional components. For example, phosphate esters can be used with the quaternary ammonium compounds. Moreover, thiocarbonyl compounds can also be added to the corrosion inhibitor compositions. These corrosion inhibitors are effective against ferrous metal corrosion.

U.S. Pat. No. 3,623,979A describes amide based oil-soluble, brine-dispersible corrosion inhibitors for continuous or intermittent application of liquid coatings of these inhibitors on metals, particularly ferrous metals, in contact with sweet and sour petroliferous well fluids. The amide is condensation product of polymeric acid and 1-aminoalkyl-2-alkyl-2-imidazoline.

Corrosion that occurs in primary production and water injection systems is rather complex. Evaluation of corrosion inhibitors for such application should include the study of variables such as: composition of water, oils and gases; method and rate of production; water-oil ratio; wetting power of the oil; pH of the fluids; temperatures; quantity of hydrogen sulfide, carbon dioxide, oxygen, and other gases present; formation of the protective coatings such as paraffin from the oil or calcium carbonate from the water; and, composition of inhibitor and method of application. In order to reduce inventories, achieve cost reduction by volume purchases, and obtain maximum treating effective ness, a class of corrosion inhibitors, and compositions thereof are required which afford protection to metals in a variety of corrosive environments.

From the available prior arts, it is evident that researchers have in the past developed several products based on combinations of different classes of chemicals. However, most of those commercial corrosion inhibitors do not exhibit complete corrosion protection at a low concentration. Therefore, finding a high performing cost effective product for application as corrosion inhibitor is well desired.

SUMMARY OF THE INVENTION

Accordingly, the present invention provides a unique combination of different amounts of various chemicals in order to obtain a high performing oil soluble water dispersible corrosion inhibitor composition.

The present invention provides an oil soluble water dispersible corrosion inhibitor composition for mitigating internal corrosion of crude oil transportation pipeline and the corrosion inhibitor composition comprises a dimer fatty acid (DFA); a long chain alkyl amine; an ester derivative of alkylated phenol; an organic acid or a mixture of acids and a solvent. The present invention further relates to an oil soluble water dispersible corrosion inhibitor composition comprising a dimer fatty acid (DFA) in an amount ranging from 40 to 80% by weight; a long chain alkyl amine in an amount ranging from 1 to 10% by weight; an ester derivative of alkylated phenol in an amount ranging from 0.01 to 7% by weight; an organic acid or a mixture of acids in an amount ranging from 5 to 10% by weight and a solvent in an amount ranging from 10 to 40% by weight.

The present invention further relates to a process for preparation of an oil soluble water dispersible corrosion inhibitor composition the process comprising:
  (a) dissolving a dimer fatty acid in a solvent to obtain a mixture (i);
  (b) adding an alkyl amine drop wise to the mixture (i) obtained in step (a) to obtain a mixture (ii) and stirring the mixture (ii) at a temperature ranging from 40° C.-60° C.;

(c) adding ester derivative of alkylated phenol to the mixture (ii) obtained in step (b) to obtain a mixture (iii);

(d) adding an organic acid or a mixture of acids to the mixture (iii) obtained in step (c) to obtain a mixture (iv); and (e) stirring the mixture (iv) obtained in step (d) at ambient temperature to obtain the corrosion inhibitor composition.

In a feature, the present invention provides a process for mitigating internal corrosion of pipeline due to a petroleum product, said process comprises adding the oil soluble water dispersible corrosion inhibitor composition as disclosed in present invention to the petroleum product to be stored or transported.

The oil soluble water dispersible corrosion inhibitor composition disclosed in the present invention comprises of constituents that facilitates layer formation of the corrosion inhibiting chemicals on the metal surface and prevents the corrosion of metal surface effectively.

Further, being water dispersible, the corrosion inhibitor facilitates mitigation of internal corrosion of pipelines during transportation of petroleum products.

OBJECTIVES OF THE PRESENT INVENTION

The primary objective of the present invention is to provide a high performing oil soluble water dispersible corrosion inhibitor composition.

Another objective of the present invention is to provide a process for the production of corrosion inhibitor composition which is very simple and easy to scale up.

Yet another objective of the present invention is to provide the developed corrosion inhibitor composition which is highly effective to address internal corrosion issues during transportation of crude oil through pipeline as it is water dispersible also.

DETAILED DESCRIPTION OF THE INVENTION

The present invention relates to an oil soluble and water dispersible corrosion inhibitor composition for mitigating internal corrosion of pipelines during crude oil transportation due to presence of water in crude oil. Further, the present invention relates to a process for the preparation of the oil soluble and water dispersible corrosion inhibitor composition and subsequently a process for protecting the internal metal surface of pipeline from corrosion due to a petroleum product using the presently disclosed corrosion inhibitor composition.

According to the main feature, the present invention provides an oil soluble water dispersible corrosion inhibitor composition comprising:
(a) a dimer fatty acid (DFA);
(b) a long chain alkyl amine;
(c) an ester derivative of alkylated phenol;
(d) an organic acid or a mixture of acids; and
(e) a solvent.

In an embodiment, the present invention provides an oil soluble water dispersible corrosion inhibitor composition consisting essentially of:
(a) a dimer fatty acid (DFA);
(b) a long chain alkyl amine;
(c) an ester derivative of alkylated phenol;
(d) an organic acid or a mixture of acids; and
(e) a solvent.

In a preferred embodiment, the present invention provides an oil soluble water dispersible corrosion inhibitor composition consisting of:
(a) a dimer fatty acid (DFA);
(b) a long chain alkyl amine;
(c) an ester derivative of alkylated phenol;
(d) an organic acid or a mixture of acids; and
(e) a solvent.

In a detailed embodiment, the present invention provides an oil soluble water dispersible corrosion inhibitor composition comprising:
a) 40-80% by weight of dimer fatty acid(DFA);
b) 1-10% by weight of long chain alkyl amine;
c) 0.01-7% by weight of ester derivative of alkylated phenol;
d) 5-10% by weight of organic acid or mixture of acids; and
e) 10-40% by weight of organic diluents.

In another embodiment, the present invention provides an oil soluble water dispersible corrosion inhibitor composition consisting essentially of:
a) 40-80% by weight of dimer fatty acid(DFA);
b) 1-10% by weight of long chain alkyl amine;
c) 0.01-7% by weight of ester derivative of alkylated phenol;
d) 5-10% by weight of organic acid or mixture of acids; and
e) 10-40% by weight of organic diluents.

In a preferred embodiment, the present invention provides an oil soluble water dispersible corrosion inhibitor composition consisting of:
a) 40-80% by weight of dimer fatty acid(DFA);
b) 1-10% by weight of long chain alkyl amine;
c) 0.01-7% by weight of ester derivative of alkylated phenol;
d) 5-10% by weight of organic acid or mixture of acids; and
e) 10-40% by weight of organic diluents.

In an embodiment of the present invention, the dimer fatty acid is having alkyl chain of carbon atoms ranging from 30 to 50.

In another embodiment of the present invention, the long chain alkyl amine is having carbon atoms ranging from 12 to 18.

In another embodiment of the present invention, the organic acid is having carbon atoms ranging from 2 to 18.

In yet another embodiment of the present invention, the organic acid is selected from the group consisting of acetic acid, oleic acid, myristic acid, fatty acids or combinations thereof.

In an embodiment of the present invention, the solvent is an aromatic rich solvent.

In a preferred embodiment, the solvent is an aromatic solvent or an aliphatic solvent or a petroleum solvent, selected from the group consisting of xylene, toluene, alkylated benzene, isopropanol, 2-ethyl-1-hexanol, butanol, pentanol, pre-fractionator rerun column bottom, or combinations thereof.

The developed composition consists of acid-amine complex as corrosion inhibiting agent and mixture of organic acids as dispersing agent. In the developed corrosion inhibitor formulation, the mixture of organic acids helps to disperse well in the water phase of the oil water emulsion. The high polar nature of the corrosion inhibitor composition then forms a complex on the metal surface of the pipeline. Esters of alkylated phenol help in the better film formation. These three synergistic factors reduce the water wetting of the inner surface of the pipelines and thereby reducing internal pipeline corrosion.

In a further feature, the present invention provides a process for preparation of an oil soluble water dispersible corrosion inhibitor composition, the process comprising:
(a) dissolving a dimer fatty acid in a solvent to obtain a mixture (i);
(b) adding an alkyl amine drop wise to the mixture (i) obtained in step (a) to obtain a mixture (ii) and stirring the mixture (ii) at a temperature ranging from 40° C.-60° C.;
(c) adding ester derivative of alkylated phenol to the mixture (ii) obtained in step
(b) to obtain a mixture (iii);
(d) adding an organic acid or a mixture of acids to the mixture (iii) obtained in step (c) to obtain a mixture (iv); and
(e) stirring the mixture (iv) obtained in step (d) at ambient temperature to obtain the corrosion inhibitor composition.

In an embodiment, the ambient temperature ranges from 20°-30° C.

In an embodiment, the fatty acid dimer in the process of preparation of the corrosion inhibitor composition is having alkyl chain of carbon atoms ranging from 30 to 50.

In another embodiment, the alkyl amine in the process of preparation of the corrosion inhibitor composition is a long chain alkyl amine having carbon atoms ranging from 10 to 18.

In another embodiment, the organic acid in the process of preparation of the corrosion inhibitor composition is selected from the group consisting of acetic acid, oleic acid, myristic acid, fatty acids or combinations thereof.

In yet another embodiment, the solvent in the process of preparation of the corrosion inhibitor composition is an aromatic solvent or a aliphatic solvent or a petroleum solvent, selected from the group consisting of xylene, toluene, alkylated benzene, isopropanol, 2-ethyl-1-hexanol, butanol, pentanol, pre-fractionator rerun column bottom, or combinations thereof.

In a detailed feature, the stirring of mixture (ii) in the process of preparation of the corrosion inhibitor composition is performed for a period ranging from 1 to 2 hours, while stirring of mixture (iv) is performed for a period ranging from 0.5 to 1 hour.

In another feature, the present invention provides a process for mitigating internal corrosion of crude oil transportation pipeline, the process comprising adding the oil soluble water dispersible corrosion inhibitor composition of the present invention to the crude oil to be stored or transported.

According to the further embodiments, the present invention covers the single step reaction to produce the corrosion inhibitor composition from dimer fatty acid, long chain alkyl amine, mixture of fatty acid in the presence of naturally occurring alkylated phenol in a suitable solvent. Various combinations of the corrosion inhibitor composition are thus prepared and the performance of the corresponding compositions for mitigating internal corrosion of crude oil transportation pipeline is evaluated based on an internationally accepted test method NACE 1D182, commonly referred to as the "Rotating wheel test".

The corrosion inhibitor of the present invention is applied as batch dosing in offshore crude oil transportation pipelines. The corrosion inhibitor is allowed to be in contact with the surface of the pipelines for a fixed amount of time which is to be protected from corrosion. During this period, inhibitor film is formed on the surface and it protects the surface during the passage of crude oil.

The present invention thus provides the following technical advantages:
Novel composition, highly useful in producing better film for protection from corrosion.
Single step reaction, easy to scale up
The product can be used as such without further processing.
The developed composition is highly effective corrosion inhibitor composition.
The product performance is better in comparison to commercial products.

The following examples are given for the purpose of further illustrating the invention and do not limit the scope of the present invention. All percentages and parts are based on weight unless otherwise indicated.

Typical Reaction Procedure:

In a typical reaction process, 46.40 wt % of dimer fatty acid was dissolved in 36.40 wt % of pre-fractionator rerun column bottom and 7.60 wt % of laurylamine was added drop wise to the mixture. After complete addition of amine the mixture was stirred at 50° C. for one hour. Then 0.50 wt % of ester derivative of alkylated phenol was added to the mixture followed by addition of 9.10 wt % of mixture of organic acid. The reaction mixture stirred for another half an hour at room temperature and was ready for use.

The prepared blend contains 63.60% of active content.

Example 1: The corrosion inhibitor composition was prepared by mixing of (a) 60% by weight of dimer fatty acid (DFA), and (b) 40% by weight of pre-fractionator rerun column bottom at room temperature. The prepared blend contains 60% of active content.

Example 2: The corrosion inhibitor composition was prepared by mixing of (a) 70% by weight of dimer fatty acid (DFA), (b) 1% by weight of laurylamine, (c) 29% by weight of pre-fractionator rerun column bottom at room temperature.

Example 3: The corrosion inhibitor composition was prepared by mixing of (a) 51% by weight of dimer fatty acid (DFA), (b) 9% by weight of laurylamine, (c) 40% by weight of pre-fractionator rerun column bottom at room temperature.

Example 4: The corrosion inhibitor composition was prepared by mixing of (a) 51.05% by weight of dimer fatty acid(DFA), (b) 8.40% by weight of laurylamine, (c) 0.54% by weight of ester derivative of alkylated phenol, (d) 40.01% by weight of pre-fractionator rerun column bottom at room temperature.

Example 5: The corrosion inhibitor composition was prepared by mixing of (a) 69.23% by weight of dimer fatty acid (DFA), (b) 0.7% by weight of laurylamine, (c) 0.07% by weight of ester derivative of alkylated phenol, (d) 30% by weight of xylene at room temperature.

Example 6: The corrosion inhibitor composition was prepared by mixing of (a) 27.2% by weight of dimer fatty acid (DFA), (b) 9.65% by weight of diethylenetriamine, (c) 1.45% by weight of ester derivative of alkylated phenol, (d) 15.6% by weight of $C_2$ organic acid (e) 21.75% by weight of xylene (f) 18.8% by weight of iso-propanol (g) 2.45% by weight of 2-ethyl-1-hexanol (h) 3.1% by weight of distilled water at room temperature.

Example 7: The corrosion inhibitor composition was prepared by mixing of (a) 46.40% by weight of dimer fatty acid (DFA), (b) 7.60% by weight of laurylamine, (c) 0.50% by weight of ester derivative of alkylated phenol, (d) 9.10% by weight of $C_2$ organic acid, (e) 36.40% by weight of pre-fractionator rerun column bottom at room temperature.

Example 8: The corrosion inhibitor composition was prepared by mixing of (a) 46.40% by weight of dimer fatty acid (DFA), (b) 7.60% by weight of laurylamine, (c) 0.50% by weight of ester derivative of alkylated phenol, (d) 9.10% by weight of $C_{18}$ organic acid, (e) 36.40% by weight of pre-fractionator rerun column bottom at room temperature.

Example 9: The corrosion inhibitor composition was prepared by mixing of (a) 46.40% by weight of dimer fatty acid (DFA), (b) 7.60% by weight of laurylamine, (c) 0.50% by weight of ester derivative of alkylated phenol, (d) 9.10% by weight of $C_{14}$ organic acid, (e) 36.40% by weight of pre-fractionator rerun column bottom at room temperature.

Example 10: The corrosion inhibitor composition was prepared by mixing of (a) 46.40% by weight of dimer fatty acid (DFA), (b) 7.60% by weight of laurylamine, (c) 0.50% by weight of ester derivative of alkylated phenol, (d) 9.10% by weight of mixture of fatty acid, (e) 36.40% by weight of pre-fractionator rerun column bottom at room temperature.

Example 11: The corrosion inhibitor composition was prepared by mixing of (a) 46.40% by weight of dimer fatty acid (DFA), (b) 7.60% by weight of olylamine, (c) 0.50% by weight of ester derivative of alkylated phenol, (d) 9.10% by weight of mixture of fatty acid, (e) 36.40% by weight of pre-fractionator rerun column bottom at room temperature.

Example 12: The corrosion inhibitor composition was prepared by mixing of (a) 46.40% by weight of dimer fatty acid (DFA), (b) 7.60% by weight of laurylamine, (c) 0.50% by weight of ester derivative of alkylated phenol, (d) 3.50% by weight of mixture of fatty acid, (e) 42.00% by weight of pre-fractionator rerun column bottom at room temperature.

Example 13: The corrosion inhibitor composition was prepared by mixing of (a) 46.40% by weight of dimer fatty acid (DFA), (b) 7.60% by weight of laurylamine, (c) 0.50% by weight of ester derivative of alkylated phenol, (d) 12.00% by weight of mixture of fatty acid, (e) 33.50% by weight of pre-fractionator rerun column bottom at room temperature.

Corrosion Inhibition Performance Study

An internationally accepted test method NACE 1D182 for evaluating performance of corrosion inhibitor for crude oil transportation pipeline is applied for evaluation of the performance of the corrosion inhibitor compositions described in Examples 1-13. This test is widely known as rotating wheel test. The detail of the test conditions and coupons are provided below.

Test Conditions:

Test medium: The test medium consists of 10% wt crude oil, 90% wt brine solution. The brine solution is prepared by dissolving 3.2% wt of sodium chloride (NaCl) solution in distilled water purged with carbon dioxide ($CO_2$).

ii. Dip solution: 85% Crude+5% brine+10% corrosion inhibitor (the tested steel coupon dipped in the solution for 10 seconds)

iii. Test temperature: Test carried out at (50±2) ° C.

iv. Pressure: Atmospheric v. Test duration: 72 hrs

Test Coupon:

i. Metal coupons shall be of API 5L X steel with approx, size of 30 mm×25 mm×3-4 mm.

ii. The surface finish shall be with 300 emery grit, free from pits & scratches.

Rotating Wheel Test:

The test medium is prepared and placed in the test container. The metal coupons are dipped into the prepared dip solution for 10 seconds. Then coupons are placed inside the container in hanging condition by holder cap in such a way that the coupon should be fully dipped into the test medium. Additionally a metal coupon shall be placed in a blank test medium (without corrosion inhibitor (CI)) to evaluate the extent of corrosion without CI treatment. Wheel test for both the test medium are carried out at 50±2° C. temperature and atmospheric pressure at a speed of 16-20 rpm for 72 hours in duplicate. After completion of the test, the coupons are taken out from the container and cleaned as per ASTM G1 test method. A solution with designation C.3.1 (Clark's solution) is prepared by mixing antimony oxide (20 gm) and stannous chloride (50 gm) in hydrochloric acid (1000 ml). Each coupon is cleaned by dipping for 5 minutes in the Clark's solution.

The inhibitor efficiency of the CI is calculated as shown in Equation-1:

$$\% \text{ Protection} = \frac{Mass_{loss(without\ CI\ treatment)} - Mass_{loss(with\ CI\ treatment)}}{Mass_{loss(without\ CI\ treatment)}}$$

A minimum of 80% of the exposed coupons should be free from pits, scratches on visual inspection at a minimum effective concentration of corrosion inhibitor composition to pass the rotating wheel test.

The performance evaluation of developed corrosion inhibitor composition was conducted by rotating wheel test method in crude oil from different sources in order to find out the best CI composition. The wheel test results are given below in Table 1.

TABLE 1

Performance of the corrosion inhibitor compositions based on the rotating wheel test

| S. No | Corrosion inhibitor composition | % Corrosion protection |
|---|---|---|
| 1 | Example 1 | 20 |
| 2 | Example 2 | 40 |
| 3 | Example 3 | 60 |
| 4 | Example 4 | 75 |
| 5 | Example 5 | 50 |
| 6 | Example 6 | 83 |
| 7 | Example 7 | 75 |
| 8 | Example 8 | 75 |
| 9 | Example 9 | 81 |
| 10 | Example 10 | >90 |
| 11 | Example 11 | >90 |
| 12 | Example 12 | 75 |
| 13 | Example 13 | 80 |
| 14 | Reference crude oil | 0 |

The results in 'Table 1' demonstrate that the corrosion inhibitor composition of the present invention exhibits significant corrosion protection compared to the reference crude oil containing no corrosion inhibitor as per rotating wheel test method at a offshore batch dosage concentration. Dimer fatty acid as in 'Example 1' itself did not pass the wheel test method. But addition of lauryl amine to dimer fatty acid shows improvement in the corrosion inhibition results as shown in the 'Example 2'. An increased % corrosion protection is observed when amine concentration has been increased as shown in 'Example 3'. To further improve the performance, naturally occurring alkylated phenol has been added to the composition mixture of 'Example 4'. Organic acids (acetic acid, oleic acid, myristic acid, and mixture of fatty acids) have been added to the composition mixture in order to achieve further improvement of the corrosion protection performance as shown in 'Example 7, 8, 9 & 10'. Significant improvement in the performance has been observed in 'Examples 9 & 10' after the addition of mixture of fatty acids and myristic acid to the composition of 'Example 4'. Oleylamine has also shown improved corrosion protection in 'Example 11'. The % corrosion protection decreased significantly when the amount of mixture of fatty acid was decreased to 3.5% 'Example 12' and was increased to 12.0% 'Example 13'.

The optimized formulation composition (example 10) was critically evaluated for its physicochemical properties like thermal stability test, storage stability, water dispersibility study etc.

Thermal stability test: The developed corrosion inhibitor composition was found to be thermally stable at 60±2° C. FT-IR spectroscopy of the tested corrosion inhibitor composition was compared with the fresh corrosion inhibitor composition. The comparison of FT-IR spectroscopy confirms that both the spectroscopies are matching with each other. There are no chemical changes found in the corrosion inhibitor composition even after heating the composition at 60±2° C. for five days.

Storage stability: The corrosion inhibitor has been stored for a period of minimum 12 months in a glass container under ambient climatic conditions. The corrosion inhibitor didn't show any precipitation, layering, or other evidence of gross separation or degradation after 12 months.

Dispersibility study: The water dispersibility study was carried out of the developed formulation with respect to commercial product in 3.2% brine solution. The dispersibility study results show that the developed corrosion inhibitor composition is dispersible in 3.2% brine solution upto 2000-2500 ppm. The high dispersibility of developed composition leads to its effective corrosion inhibition performance.

The invention claimed is:

1. An oil soluble water dispersible corrosion inhibitor composition, the composition consisting of:
   (a) a dimer fatty acid (DFA), wherein the dimer fatty acid (DFA) has about 30-50 carbon atoms in its alkyl chain;
   (b) an alkyl amine having 12-18 carbon atoms;
   (c) an ester derivative of alkylated phenol;
   (d) an organic acid or a mixture of organic acids; and
   (e) a solvent.

2. The composition as claimed in claim 1, wherein the dimer fatty acid (DFA) is present in an amount ranging from 40 to 80% by weight.

3. The composition as claimed in claim 1, wherein the alkyl amine is present in an amount ranging from 1 to 10% by weight.

4. The composition as claimed in claim 1, wherein the ester derivative of alkylated phenol is present in an amount ranging from 0.01 to 7% by weight.

5. The composition as claimed in claim 1, wherein the organic acid or mixture of organic acids is present in an amount ranging from 5 to 10% by weight.

6. The composition as claimed in claim 1, wherein the solvent is present in an amount ranging from 10 to 40% by weight.

7. The composition as claimed in claim 1, wherein the organic acid has 2 to 18 carbon atoms.

8. The composition as claimed in claim 1, wherein the organic acid or mixture of organic acids is selected from the group consisting of acetic acid, oleic acid, myristic acid, fatty acids, and combinations thereof.

9. The composition as claimed in claim 1, wherein the solvent is selected from the group consisting of xylene, toluene, alkylated benzene, isopropanol, 2-ethyl-1-hexanol, butanol, pentanol, pre-fractionator rerun column bottom, and combinations thereof.

10. A process for preparation of an oil soluble water dispersible corrosion inhibitor composition, the process consisting of:
   (a) dissolving a dimer fatty acid in a solvent to obtain a mixture (i), wherein the dimer fatty acid (DFA) has about 30-50 carbon atoms in its alkyl chain;
   (b) adding an alkyl amine drop wise to the mixture (i) obtained in step (a) to obtain a mixture (ii) and stirring the mixture (ii) at a temperature ranging from 40° C.-60° C., wherein the alkyl amine has 12-18 carbon atoms;
   (c) adding an ester derivative of an alkylated phenol to the mixture obtained in step (b) to obtain a mixture (iii);
   (d) adding an organic acid or a mixture of organic acids to the mixture (iii) obtained in step (c) to obtain a mixture (iv); and
   (e) stirring the mixture (iv) obtained in step (d) at room temperature to obtain the corrosion inhibitor composition, wherein the process is a single step reaction.

11. The process as claimed in claim 10, wherein the solvent is an aromatic solvent or an aliphatic solvent or a petroleum solvent, selected from the group consisting of xylene, toluene, alkylated benzene, isopropanol, 2-ethyl-1-hexanol, butanol, pentanol, pre-fractionator rerun column bottom, or combinations thereof.

12. The process as claimed in claim 10, wherein the organic acid is selected from the group consisting of acetic acid, oleic acid, myristic acid, fatty acids, or combinations thereof.

13. The process as claimed in claim 10, wherein the stirring in step (b) is performed for a period ranging from 1 to 2 hours and stirring in step (e) is performed for a period ranging from 0.5 to 1 hour.

14. A process for mitigating internal corrosion of crude oil transportation pipeline, the process comprising adding the oil soluble water dispersible corrosion inhibitor of claim 1 to crude oil to be stored or transported.

* * * * *